(12) United States Patent
Espinasse et al.

(10) Patent No.: US 8,007,203 B2
(45) Date of Patent: Aug. 30, 2011

(54) METHOD AND INSTALLATION FOR CONNECTING A RIGID SUBMARINE PIPE AND A FLEXIBLE SUBMARINE PIPE

(75) Inventors: Philippe Espinasse, Bihorel (FR); Jean-Pascal Biaggi, La Celle Saint Cloud (FR)

(73) Assignee: Technip France (FR)

( * ) Notice: Subject to any disclaimer, the term of this patent is extended or adjusted under 35 U.S.C. 154(b) by 682 days.

(21) Appl. No.: 11/995,296

(22) PCT Filed: Jul. 10, 2006

(86) PCT No.: PCT/FR2006/001676
§ 371 (c)(1),
(2), (4) Date: Jan. 28, 2008

(87) PCT Pub. No.: WO2007/006963
PCT Pub. Date: Jan. 18, 2007

(65) Prior Publication Data
US 2008/0309077 A1    Dec. 18, 2008

(30) Foreign Application Priority Data

Jul. 11, 2005  (FR) ...................................... 0507382

(51) Int. Cl.
*F16L 1/16* (2006.01)
(52) U.S. Cl. .................. 405/172; 405/171; 405/169
(58) Field of Classification Search .................. 405/158, 405/169, 170, 171, 172, 224, 224.2
See application file for complete search history.

(56) References Cited

U.S. PATENT DOCUMENTS

| 4,906,137 | A |   | 3/1990 | Maloberti et al. | 405/195 |
| 5,505,560 | A | * | 4/1996 | Brown et al. | 405/169 |
| 5,582,252 | A |   | 12/1996 | Richmond et al. | 166/352 |
| 6,109,830 | A |   | 8/2000 | de Baan | 405/170 |
| 6,109,833 | A | * | 8/2000 | Savy | 405/169 |
| 6,146,052 | A | * | 11/2000 | Jacobsen et al. | 405/169 |
| 6,742,594 | B2 | * | 6/2004 | Langford et al. | 405/171 |
| 6,854,930 | B2 | * | 2/2005 | Pionetti | 405/169 |
| 6,869,253 | B2 | * | 3/2005 | Biolley | 405/224.2 |

(Continued)

FOREIGN PATENT DOCUMENTS
EP    1 035 011    9/2000
(Continued)

OTHER PUBLICATIONS

International Search Report and Written Opinion dated Jan. 3, 2007 in corresponding PCT International Application No. PCT/FR2006/001676.

*Primary Examiner* — Frederick L Lagman
(74) *Attorney, Agent, or Firm* — Ostrolenk Faber LLP

(57) ABSTRACT

A method and an installation for connecting a rigid submarine pipe and a flexible submarine pipe. The rigid pipe terminates in a free connection end. The flexible pipe has a flow-line portion and a suspended portion. The flow-line portion has an input end connected to the free connection end. The installation comprises an anchoring device to hold the flow-line portion anchored at an anchor point and to allow the flow-line portion to form an undulation. The anchoring device is suitable for holding the anchor point at a distance and close to the free connection end to form the undulation between the anchor point and the free connection end.

8 Claims, 2 Drawing Sheets

U.S. PATENT DOCUMENTS

| | | | |
|---|---|---|---|
| 7,025,535 B2 * | 4/2006 | Chiesa et al. | 405/169 |
| 7,040,841 B2 * | 5/2006 | Kelm et al. | 405/169 |
| 7,044,228 B2 * | 5/2006 | Langford et al. | 405/171 |
| 7,628,568 B2 * | 12/2009 | Critsinelis | 405/169 |
| 2003/0086763 A1 | 5/2003 | Hooper et al. | 405/224.4 |
| 2004/0156684 A1 * | 8/2004 | Pionetti | 405/224 |
| 2005/0271476 A1 * | 12/2005 | Chiesa et al. | 405/172 |
| 2008/0253842 A1 * | 10/2008 | Wolbers et al. | 405/169 |

FOREIGN PATENT DOCUMENTS

| | | |
|---|---|---|
| WO | WO 98/12411 | 3/1998 |
| WO | WO 03/095788 | 11/2003 |

* cited by examiner

METHOD AND INSTALLATION FOR CONNECTING A RIGID SUBMARINE PIPE AND A FLEXIBLE SUBMARINE PIPE

CROSS-REFERENCE TO RELATED APPLICATION

The present application is a 35 U.S.C. §§371 national phase conversion of PCT/FR2006/001676, filed 10 Jul. 2006, which claims priority of French Application No. 0507382, filed Jul. 11, 2005. The PCT International Application was published in the French language.

BACKGROUND OF THE INVENTION

The present invention relates to a method for connecting a rigid submarine pipe and a flexible submarine pipe, and to an installation suitable for using this connection method.

These submarine pipes are designed to transport hydrocarbons in a marine environment and in particular to carry the hydrocarbons between a submarine installation installed on the seabed and a surface marine installation, for example a platform situated on the surface of the marine environment.

The rigid submarine pipe is extended over the seabed from a submarine installation, and it terminates in a free connection end. The flexible submarine pipe has a flow-line portion that lies on the seabed and has a suspended portion that is designed to join the surface installation. The flow-line portion terminates in an input end that is connected at the free connection end of the rigid pipe so that the suspended portion lies in a catenary overhanging the free connection end. In addition, the installation comprises anchoring means to hold the flow-line portion anchored in the seabed at an anchor point of the flow-line portion so as to allow this flow-line portion to form an undulation separated from the seabed, between the anchor point and the suspended portion, and thereby to prevent this flow-line portion from impacting on the seabed when the vertical position of the surface installation fluctuates.

Reference may in particular be made to document FR 2 746 977, which describes such an installation.

However, in certain operating circumstances, the temperature variations of the extracted hydrocarbon cause longitudinal deformations of the rigid pipe and as a result the movement of the free connection end.

Consequently, the flow-line portion of the flexible pipe that lies between the free connection end of the rigid pipe and the anchor point is likely to be moved in translation on the seabed, which on the one hand causes its intrinsic longitudinal deformation and, on the other hand its abrasion. The aging of this flow-line portion is then accelerated.

In addition, the suspended portion of flexible pipe that lies as a catenary exerts a longitudinal pull on the rigid pipe at its free connection end. Now, when the rigid pipe retracts, particularly when the flow of hydrocarbon is stopped and the pipe cools, the retraction forces oppose the pulling forces exerted by the flexible pipe, so that the rigid pipe risks being damaged. Although it was feasible before, for shallow and medium-depth submarine installations, to work easily on the damaged rigid pipe, this work is no longer feasible for submarine installations at very great depths.

SUMMARY OF THE INVENTION

A problem that then arises and that the present invention aims to solve is to propose a connection method that makes it possible to dispense with the aforementioned disadvantages and particularly that makes it possible to prevent working at great depth.

For the purpose of solving this problem, according to a first aspect, the present invention proposes, a method for connecting a rigid submarine pipe and a flexible submarine pipe. The submarine pipes are designed to transport hydrocarbons in a marine environment between a submarine installation installed on a seabed and a surface marine installation situated on the surface of the marine environment. The rigid submarine pipe lays on the seabed and extends from the submarine installation, and terminates in a free connection end. The flexible submarine pipe has a flow-line portion lying in the vicinity of the seabed and a suspended portion designed to join the surface marine installation. The flow-line portion terminates in an input end. The connection method is of the type according to which the input end and the free connection end are connected by laying the suspended portion as a catenary substantially in line with the vicinity of the free connection end and by keeping the flow-line portion anchored in the seabed at an anchor point of the flow-line portion to allow the flow-line portion to form a deformable undulation. According to the method, the formation of the undulation is allowed between the anchor point and the free connection end so as to allow the relative movement of the free connection end relative to the anchor point and the deformation of the undulation.

Thus, one feature of the invention lies in the use of the undulation of the flow-line portion of the flexible pipe, between the anchor point and the free connection end of the rigid pipe, when a hot hydrocarbon flows in the rigid pipe and it lengthens. The anchor point is clearly by nature in a fixed position in a mid-plane defined by the seabed. In this way, the longitudinal and transverse variations of the rigid pipe that are due to the irregular flow of a hot hydrocarbon in this pipe, and/or due to the variations of pressure, and that cause the alternating movement of the pipe and consequently the free connection end on the seabed, with amplitudes of the order of a meter for example, are passed on in the undulated flow-line portion which has a bend radius that varies substantially, without affecting the integrity of this flow-line portion. Thus, the rigid pipe deforms freely, without stress and does not risk being damaged, so that work is no longer necessary to repair it. In addition, this method is easy to apply and requires only one connection between the flexible pipe and the rigid pipe which makes it economically advantageous.

Furthermore, and according to a particularly advantageous embodiment, the anchor point is connected, for example, to an anchor pile installed along the rigid pipe by means of a flexible anchor line in order to make the connection easier. Because, specifically, it is sufficient, to form the undulation, to lay the flexible pipe in a substantially asymptotic manner between the free connection end and the surface installation, to then connect using an anchor line, the anchor pile and the anchor point of the flexible pipe then situated at a distance from the seabed and then to still further lower the flexible pipe towards the seabed so that the undulation forms between the anchor point of the flow-line portion and the anchor pile.

However, according to another alternative, the anchor line is laid first, before the installation is placed in service, along the flexible pipe, so that the undulation forms only when the rigid pipe lengthens under the effect of the flow of a hot hydrocarbon. This is because, in fact, the rigid pipe is initially at its minimum length.

According to an advantageous feature, the flow-line portion forming an undulation is fitted with bend limiters, located on the flow-line portion and situated between the free connection end and the anchor point, to limit the bend of the undulation and in particular to allow an even bend and prevent kinks.

Advantageously, these bend form sleeves that surround the flow-line portion. The undulation is formed substantially in a horizontal plane, so that the sleeves can, where necessary, rest on the seabed and protect the flexible pipe from abrasion.

According to another embodiment, the undulation is formed substantially in a vertical plane by fitting the flow-line portion with buoys, and all contact with the seabed is thus prevented while allowing an even variation of the bend radius of the flow-line portion.

According to another aspect, the present invention proposes an installation for connecting a rigid submarine pipe and a flexible submarine pipe. The submarine pipes are designed to transport hydrocarbons in a marine environment between a submarine installation installed on a seabed and a surface marine installation situated on the surface of the marine environment. The rigid submarine pipe lying on the seabed from the submarine installation and terminates in a free connection end. The flexible submarine pipe has a flow-line portion lying in the vicinity of the seabed and a suspended portion designed to join the surface marine installation. The flow-line portion terminates in an input end. The input end and the free connection end are connected together so that the suspended portion lies as a catenary substantially in line with the vicinity of the free connection end. The installation comprises anchoring means to hold the flow-line portion anchored in the seabed at an anchor point of the seabed and so as to allow the flow-line portion to form a deformable undulation. According to the invention, the anchoring means are suitable for holding the anchor point at a distance and close to the free connection end to allow the formation of the undulation between the anchor point and the free connection end.

As will be explained hereinafter in greater detail, the anchoring means advantageously comprise a clamping member mounted on the flow-line portion at the anchor point and an anchor pile installed along the rigid pipe. The clamping member is connected to the anchor pile by means of an anchor line, for example, when the aforementioned installation method is used, in order to allow the undulation to form easily.

In addition, the flow-line portion forming an undulation is preferably fitted with bend limiters or else it comprises a plurality of buoys installed step by step on the flow-line portion, between the anchor point and the free connection end to form the undulation substantially in a vertical plane, which makes it possible to obtain a substantially even bend and in addition, to separate the flow-line portion relative to the seabed and prevent any abrasion.

Other features and advantages of the invention will emerge from reading the following description of a particular embodiment of the invention given as an indication but not limiting, with reference to the appended drawings in which:

DESCRIPTION OF THE PREFERRED EMBODIMENTS

Figure 1:
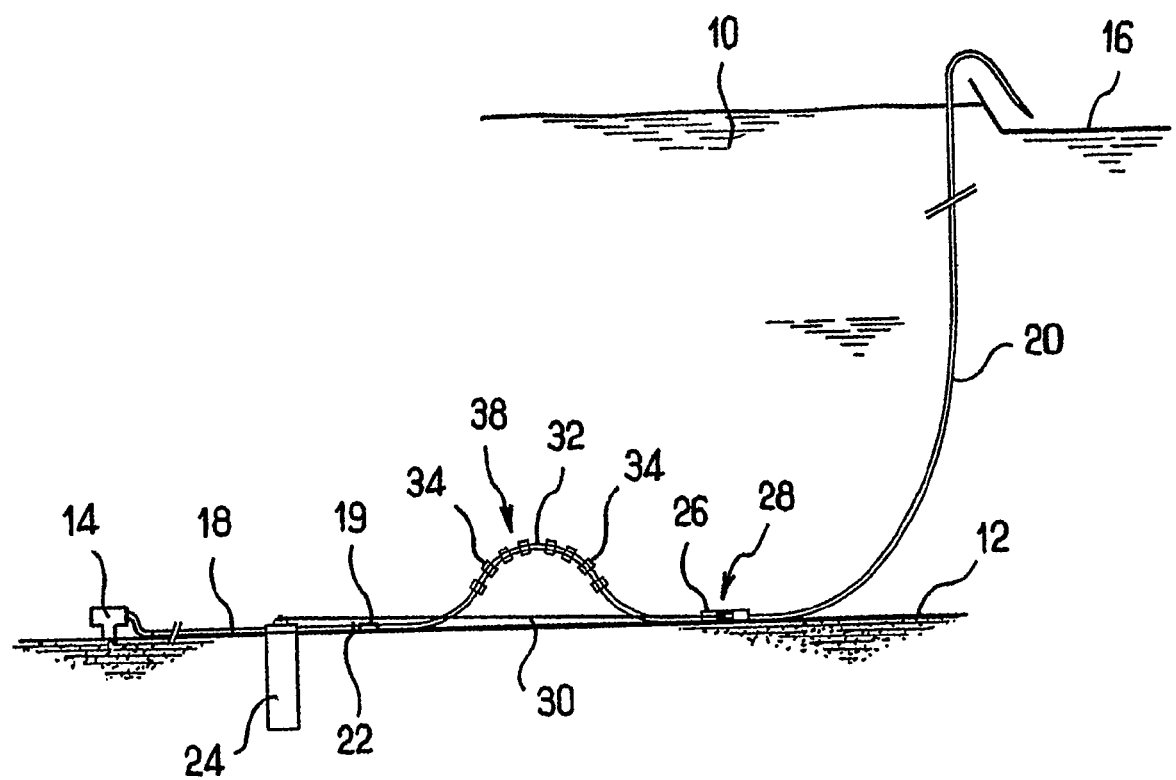
FIG. 1 is a partial schematic view of a first embodiment of a connection installation according to the invention.

FIG. 1 shows schematically and in vertical section a marine environment having a surface 10 and a bed 12. A submarine installation 14 installed on the bed 12 is designed for the extraction of a hydrocarbon. A surface installation 16 is designed to recover and store a hydrocarbon. Between the submarine installation 14 and the surface installation 16, a rigid pipe 18 lies on the seabed 12 and extends from the submarine installation 14. A flexible pipe 20 is connected to the rigid pipe by an input end 19 and extends the rigid pipe and then joins to the surface installation 16. Together these elements make it possible to recover the hydrocarbon.

The rigid pipe 18 has a free connection end 22. It is capable of deforming longitudinally under the effect of the variations of pressure of the hydrocarbon and/or of temperature of the pipe caused by the flow variations of a hydrocarbon that is hotter than the temperature of the marine environment at the seabed 12. Consequently, during operation of the submarine installation 14, the free connection end 22 is capable of being moved in translation, with amplitudes of the order of one meter.

In order to overcome the problem posed by this dimensional variation, an anchor pile 24 in particular is installed along the rigid pipe 14 back from the free connection end 22, a clamping member 26 is mounted on an anchor point 28 of the flexible pipe 20 and, when the flexible pipe 20 is lowered in the marine environment, according to a particular embodiment, the clamping member 26 and the anchor pile 24 are connected by means of a tight anchor line 30 then forming a chord or an arc, while a flow-line portion 32 of the flexible pipe 20 lies in an arc between the input end 19 situated on the seabed 12 and the anchor point 28. In addition, and beforehand, this arc-shaped flow-line portion 32 is here fitted with buoys 34 distributed substantially equidistantly between the input end 19 and the anchor point 28.

Then, during installation, when the flexible pipe 20 is further unwound onto the seabed 12, the anchor point 28 tends to come to rest on the seabed 12, while remaining at a constant distance from the anchor pile 24 thanks to the anchor line 30 which holds it. As a result, the flow-line portion 32, fitted with the buoys 34, is naturally moved toward the surface 10 forming an undulation 38, since the length of pipe, essentially flexible, is greater than the length of the anchor line 30. The undulation 38 appears formed facing the seabed 12 substantially vertically as illustrated in FIG. 1.

Accordingly, as the anchor point 28 is held at a fixed distance from the anchor pile 24, in a mid-direction defined by the rigid pipe 18 and the anchor line 30, any longitudinal movement of the rigid pipe 18 and hence of the free connection end 22 also moves the input end 19 of the flexible pipe 20 which then causes the undulation 38 of the flow-line portion 32 to deform and its bend radius to vary, both positively and negatively, without contact with the seabed 12, and consequently without possibility of abrasion.

In addition, the free connection end 22 of the rigid pipe 18 being free, because the flexible pipe is firmly anchored in the seabed 12 and its flow-line portion 32 bends and can deform, no stress is therefore exerted on it and, when it retracts, it cannot be damaged.

Figure 2A:
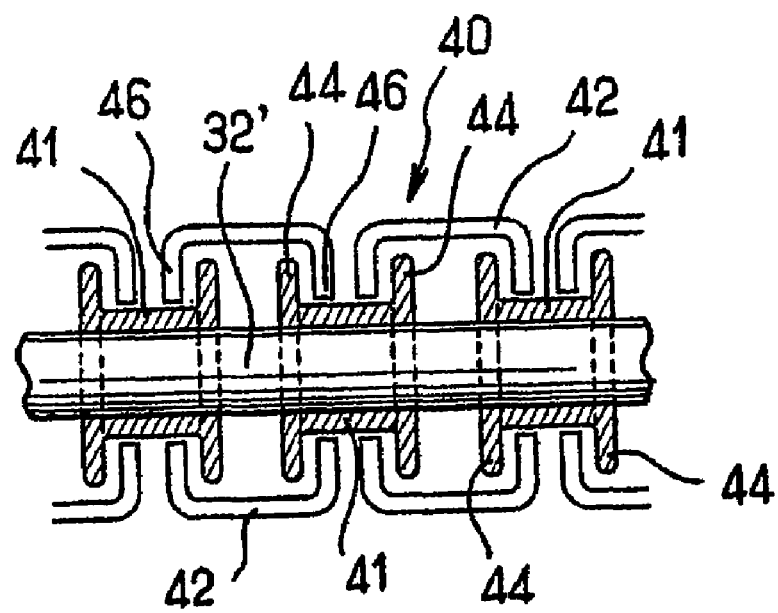
FIG. 2A is a partial schematic view in longitudinal section of a detail element of a connection installation according to a second embodiment and in a first position; and, FIG. 2B is a partial schematic view of the detail element illustrated in FIG. 2A in a second position.
Figure 2B:
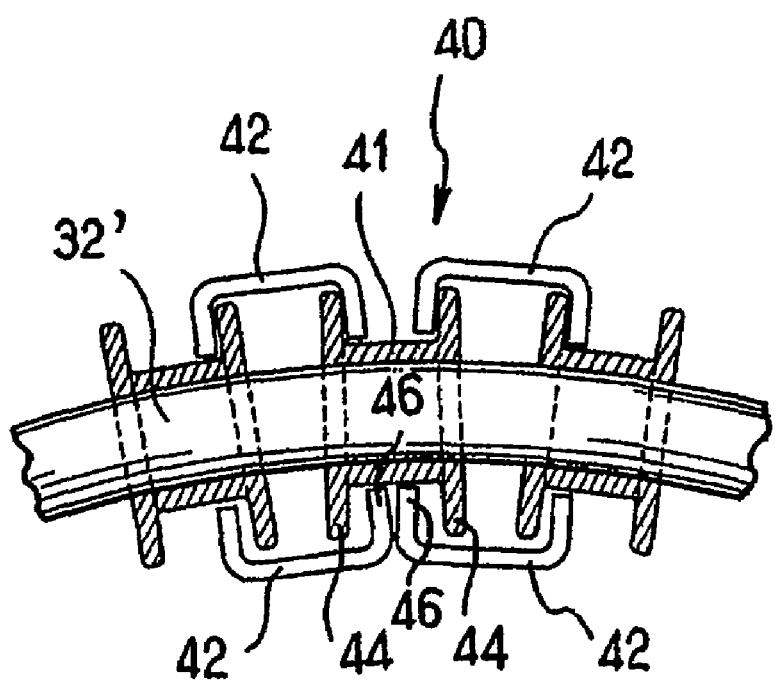

According to a second variant, the flow-line portion 32' shown partially and enlarged in FIGS. 2A and 2B is fitted with bend limiters 40 comprising tubular sleeves 41 and tubular members 42 forming staples designed to connect the tubular sleeves 41 together. The tubular sleeves 41, clamped onto the flow-line portion 32', have at each of their ends a radial collar 44, and they are installed step by step along the flow-line portion 32', radial collars 44 facing them. Furthermore, at each of their ends, the tubular members 42 have a narrowed part 46 suitable for coming to engage around the tubular sleeves 41 and behind the radial collar 44. Thus, a tubular member 42 has two ends whose narrowed part 46 is engaged respectively around a tubular sleeve 41 in order to connect two contiguous tubular sleeves 41 together while surrounding and entirely covering the flow-line portion 32'. Thus, a plurality of tubular sleeves and of tubular members mounted together around the flow-line portion 32' makes it possible to produce an articulated sheath that is both protective and capable of a limited bend.

In this way, and as illustrated in FIG. 2B, when the flow-line portion 32' bends, while the narrowed parts 46 of the ends of the tubular members 42 rest one against the other in a contact portion of their circumference, and between the radial collars 44 on one and the same tubular sleeve 41, their portions respectively diametrically opposed come to bear against the radial collars 44. Consequently, the bend of the flow-line portion 32' is limited and cannot be smaller than a determined bend radius.

Thus equipped, the flow-line portion 32', without necessarily being furnished with buoys, may then form an undulation while remaining resting on the seabed, protected as it is by the tubular members 42 which for their part are directly in contact and resting on the seabed 12. In this way, the dimensional variations of the rigid pipe 18 are likely to cause the deformation of the undulation formed by the flow-line portion 32', which, resting on the seabed 12, is, on the one hand, protected from abrasion by the tubular members 42, and, on the other hand, is prevented from inopportune kinking thanks to the interaction of the tubular members 42 and the tubular sleeves 41.

The invention claimed is:

1. A method of connecting a rigid submarine pipe configured to deform in a longitudinal direction and a flexible submarine pipe, wherein the submarine pipes are configured to transport hydrocarbon in a marine environment between a submarine installation installed on the seabed and a marine installation spaced from the submarine installation, the method comprising:

installing an end of the rigid submarine pipe at the seabed at the submarine installation on and positioning the rigid submarine pipe along the seabed such that a free connection end of the rigid submarine pipe is distal to the submarine installation;

positioning a flow-line portion of the flexible submarine pipe in the vicinity of the seabed, the flow-line portion of the flexible pipe having a first length and terminating in an input end;

suspending a suspended portion of the flexible pipe between the marine installation and the flow-line portion;

connecting the input end of the flexible pipe with the free connection end of the rigid pipe by laying the flow-line portion of the flexible pipe as a catenary oriented in line with a vicinity of the free connection end;

anchoring the flow-line portion of the flexible pipe in the seabed at an anchor point at a first distance from the input end thereof, the first distance and the first length of the flow-line portion permitting the flow-line portion to form a deformable undulation in the flow-line portion between the free connection end of the rigid submarine pipe and the anchor point in accordance with a movement of the free connection point along the seabed responsive to the deformation of the rigid submarine pipe; and connecting the anchor point to an anchor pile positioned on the seabed, the anchor pile being installed along the rigid pipe by a flexible anchor line.

2. The connection method of claim 1, further comprising applying bend limiters to the flow-line portion forming an undulation so as to restrict the bending of the undulation beyond the extent permitted by the bend limiters.

3. The connection method of claim 1, further comprising forming the undulation in a plane horizontal with respect to the seabed.

4. The connection method of claim 1, further comprising forming the undulation in a plane vertical with respect to the seabed.

5. The connection method of claim 4, further comprising fitting the flow-line portion of the flow-line with buoys for supporting the undulation in the vertical plane.

6. A connection installation for connecting a rigid submarine pipe and a flexible submarine pipe configured to define a continuous submarine pipe to transport hydrocarbons in a marine environment between a submarine installation at a seabed and a marine installation, the connection installation comprising:

the rigid submarine pipe having a longitudinal extent positioned along the seabed from the submarine installation, the rigid pipe comprising a free connection end at an end distal to the submarine installation;

the rigid pipe being configured to deform in the longitudinal direction so as to move the free connection end along the seabed;

the flexible submarine pipe comprising a flow-line portion positioned in the vicinity of the seabed and a suspended portion positioned to connect the flow-line portion to the marine installation;

the flow-line portion of the flexible pipe having a first length and comprising an input end configured to be connected together with the free end connection of the rigid pipe;

an anchor positioned at the seabed and configured to anchor the flow-line portion at an anchor point of the seabed at a first distance from the free connection end, and the first distance and the first length of the flow-line portion permitting formation of a deformable undulation of the flow-line portion between the anchor point and the free connection end of the rigid pipe in accordance with the movement of the free connection end, wherein the anchor comprises a clamp mounted on the flow-line portion at the anchor point, and the connection installation further comprising:

an anchor pile positioned in the seabed along the rigid pipe; and an anchor line connecting the clamp to the anchor pile.

7. The connection installation of claim 6, further comprising bend limiters fitted on the flow-line portion and configured to limit an extent of a bend of the undulation.

8. The connection installation of claim 6, further comprising a plurality of buoys positioned on the flow-line portion between the anchor point and the free connection end and configured to support the undulation in a plane vertical with respect to the seabed.

* * * * *